US010779650B2

(12) United States Patent
Radloff et al.

(10) Patent No.: US 10,779,650 B2
(45) Date of Patent: Sep. 22, 2020

(54) FRAME CONSTRUCTION FOR A RACK SYSTEM

(71) Applicant: Anton Schneider GmbH & Co KG, Kenzingen (DE)

(72) Inventors: Jasmin Radloff, Nufringen (DE); Constantin Ebel, Egenhausen (DE)

(73) Assignee: ANTON SCHNEIDER GMBH & CO KG, Kenzingen (DE)

( * ) Notice: Subject to any disclaimer, the term of this patent is extended or adjusted under 35 U.S.C. 154(b) by 0 days.

(21) Appl. No.: 16/554,508

(22) Filed: Aug. 28, 2019

(65) Prior Publication Data

US 2019/0380493 A1 Dec. 19, 2019

Related U.S. Application Data

(63) Continuation of application No. PCT/EP2018/056553, filed on Mar. 15, 2018.

(51) Int. Cl.
*A47B 96/14* (2006.01)
*F21V 33/00* (2006.01)
*F21Y 115/10* (2016.01)
*F21W 131/301* (2006.01)

(52) U.S. Cl.
CPC ...... *A47B 96/1433* (2013.01); *A47B 96/1441* (2013.01); *A47B 96/1466* (2013.01); *F21V 33/0012* (2013.01); *F21W 2131/301* (2013.01); *F21Y 2115/10* (2016.08)

(58) Field of Classification Search
CPC ............ A47B 96/1433; A47B 96/1466; A47B 96/1441; A47B 2220/0075; A47B 96/145; A47B 47/027; A47B 2230/002; F21V 33/0012; F21W 2131/301; F21Y 2115/10; F16B 12/2063; F16B 12/32
See application file for complete search history.

(56) References Cited

U.S. PATENT DOCUMENTS

| 3,901,612 A | * | 8/1975 | Canin | ............ F16B 7/187 403/189 |
| 4,055,253 A | * | 10/1977 | Oztekin | ............ A47F 5/103 211/189 |
| 4,585,131 A | * | 4/1986 | Crossman | ............ A47B 57/404 211/183 |

(Continued)

FOREIGN PATENT DOCUMENTS

| EP | 0 864 273 A1 | 9/1998 |
| GB | 1 059 220 A | 2/1967 |
| WO | 01 25664 A2 | 4/2001 |

*Primary Examiner* — Ko H Chan
(74) *Attorney, Agent, or Firm* — Hackler Daghighian Martino & Novak

(57) ABSTRACT

A frame construction, in particular for a rack system, includes two vertical columns each in the form of a rectangular hollow profiled column element having a longitudinal groove, the two groove legs of which lying opposite each other each have on the inside two longitudinal ribs, between which a hole pattern strip is inserted into the hollow profiled column element. A plurality of horizontal crossbeams, which are fastened to the two columns, each are in the form of a rectangular hollow profiled crossbeam element. Crossbeam connectors are fastened to the end faces of the hollow profiled crossbeam element. The crossbeam connectors each engage, with at least one pin, in one of the holes of the hole pattern strips.

17 Claims, 7 Drawing Sheets

(56) References Cited

U.S. PATENT DOCUMENTS

| | | | | |
|---|---|---|---|---|
| 4,653,652 A * | 3/1987 | Avati | ............... | F16B 12/32 |
| | | | | 211/182 |
| 4,712,286 A * | 12/1987 | Wolf | ............... | A47B 57/40 |
| | | | | 138/160 |
| 5,520,292 A * | 5/1996 | Lombardi | ............... | A47F 7/00 |
| | | | | 211/182 |
| 6,047,838 A * | 4/2000 | Rindoks | ............... | A47B 96/145 |
| | | | | 211/187 |
| 7,950,531 B2 * | 5/2011 | Morris | ............... | H04Q 1/142 |
| | | | | 211/26 |
| 8,800,787 B2 * | 8/2014 | Lohman | ............... | H05K 7/1415 |
| | | | | 211/26 |
| 9,596,948 B1 * | 3/2017 | McGinnis | ............... | A47F 5/00 |
| 2004/0001739 A1 | 1/2004 | Kirchner et al. | | |
| 2006/0086684 A1 * | 4/2006 | Wu | ............... | A47B 96/145 |
| | | | | 211/192 |
| 2008/0000861 A1 * | 1/2008 | Muellerleile | ............... | A47B 96/06 |
| | | | | 211/94.01 |

\* cited by examiner

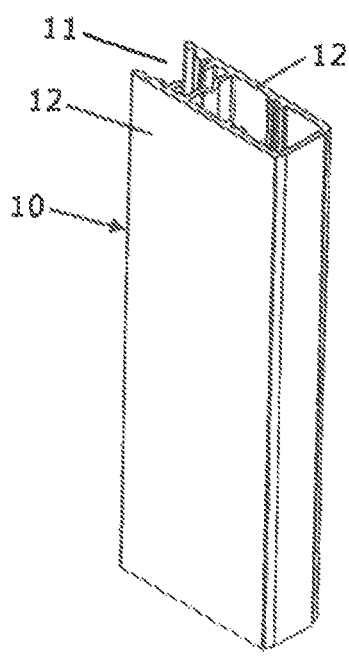
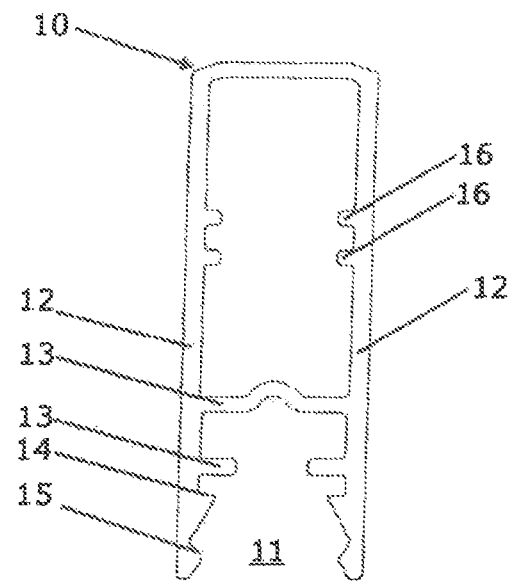
Fig. 2a    Fig. 2b
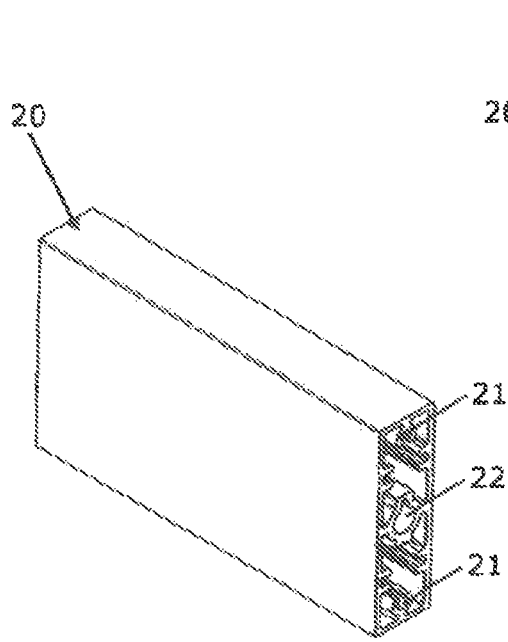
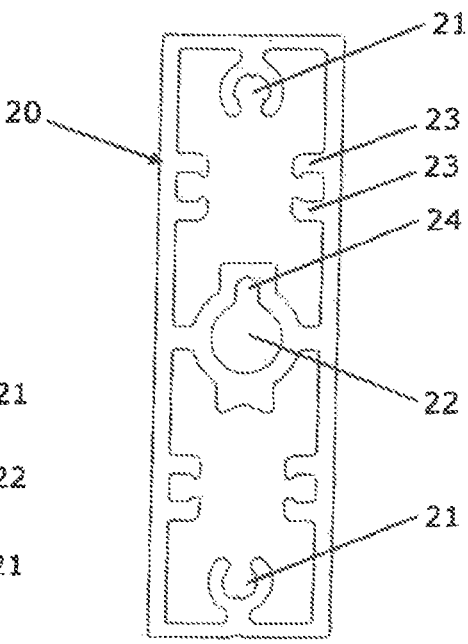
Fig. 3a    Fig. 3b

FRAME CONSTRUCTION FOR A RACK SYSTEM

CROSS-REFERENCE TO RELATED APPLICATIONS

This continuation application claims priority to PCT/EP2018/056553 filed on Mar. 15, 2018 which has published as WO 2018/197101 A1 and also the German application number 20 2017 102 414.8 filed on Apr. 25, 2017, the entire contents of which are fully incorporated herein with these references.

FIELD OF THE INVENTION

The invention relates to a frame construction, in particular for a rack system, comprising two vertical columns and a plurality of horizontal crossbeams fastened to the two columns.

Background of the Invention

Frame constructions of this type are well known.

The object of the invention is to indicate a frame construction which can be easily assembled and in which the heights of the individual crossbeams are predefined in equidistant measurements.

SUMMARY OF THE INVENTION

This object is achieved according to the invention by a frame construction, in particular for a rack system, comprising: two in particular vertical columns, which each comprise an in particular rectangular hollow profiled column element having a longitudinal groove, the two groove legs of which lying opposite each other each have two longitudinal ribs on the inside, and a hole pattern strip inserted between the two longitudinal ribs into the hollow profiled column element; and a plurality of in particular horizontal crossbeams, which are fastened to the two columns and which each have an in particular rectangular hollow profiled crossbeam element and two crossbeam connectors screwed onto the end faces thereof; wherein the crossbeam connectors each engage, with at least one pin, in one of the holes of the hole pattern strips. Preferably, the crossbeam connectors each engage, with at least two pins, in two holes of the hole pattern strips.

Principal components of the frame construction according to the invention are hollow profiled column and crossbeam elements (for example of metal), which are combined with special crossbeam connectors (for example of plastic) to form a frame. The crossbeam connectors can be designed, in conjunction with the profiles, both as a fixed and as a rapidly releasable connection. A special hole pattern strip, which is housed in the hollow profiled column element, enables a positioning of the crossbeams at defined height intervals. Preferably, the hole pattern strips have holes spaced at equidistant intervals.

Particularly preferredly, the hole pattern strips are formed of translucent material, in particular of plastic, wherein an LED strip is respectively arranged on the back of the hole pattern strips, in particular glued on or mounted in a C-groove of the hole pattern strip. Preferably, the hole pattern strips are respectively shorter than the hollow profiled column elements by approximately the height of the topmost crossbeam. The light emitted by the LEDs of the LED strip can shine through the light-permeable hole pattern strips in order in this way to enable an ambient lighting of the frame construction.

In preferred embodiments of the invention, at least the bottommost and the topmost crossbeam are fixedly connected to the columns, and a middle crossbeam is held hanging from the columns.

The crossbeam connectors always form a releasable, clippable, interlocking connection, which, by extension with a clamping unit, becomes a fixed, non-positive-locking connection group. The fixedly connected function group enables the construction of a basic frame, in which the clippable elements can in turn be introduced. Preferably, the crossbeam connectors are each formed in two parts by an inner and an outer connector part, wherein the inner connector part is fastened to the end face of the hollow profiled crossbeam element, in particular by means of a screw screwed into a screw channel of the hollow profiled crossbeam element, and is plugged, in particular suspended, into the outer connector part.

Preferably, the two groove legs of the hollow profiled column element, and the outer connector part, respectively have a mutually interacting clip contour in order to clip the outer connector part into the longitudinal groove via the groove opening of the hollow profiled column element and/or to insert it into the longitudinal groove from the end face of the hollow profiled column element.

Particularly preferredly, it is provided that a tension bolt is stuck through the two connector parts into a longitudinal channel of the hollow profiled crossbeam element and bears against the outside of the outer connector part with a bolt head, which respectively back-grips a longitudinal shoulder, arranged ahead of the two longitudinal ribs, of the hollow profiled column element. The tension bolt can be drawn further into the longitudinal channel by means of a clamping element, which runs transversely in the hollow profiled crossbeam element and, in particular, is screwed in place, in order to clamp the crossbeam to the respective column. For this purpose, the clamping element can engage in a transverse bore of the tension bolt, wherein the clamping element and/or the transverse bore are configured obliquely to one another in such a way that, upon engagement, the tension bolt is centered on the clamping element and thereby tightened.

Further advantages of the invention arise from the description, the claims and the drawings. Also, the above-mentioned features and those presented below may be used individually or in groups in arbitrary combinations. The embodiments shown and described should not be regarded as a definitive list, but rather have an exemplary character for presenting the invention.

BRIEF DESCRIPTION OF THE DRAWINGS

FIGS. 2a, 2b show in perspective view (FIG. 2a) and in cross section (FIG. 2b) a hollow profiled column element of the columns shown in FIG. 1;

FIGS. 3a, 3b show in perspective view (FIG. 3a) and in cross section (FIG. 3b) a hollow profiled crossbeam element of the crossbeams shown in FIG. 1;

DETAILED DESCRIPTION OF THE PREFERRED EMBODIMENTS

Figure 1:
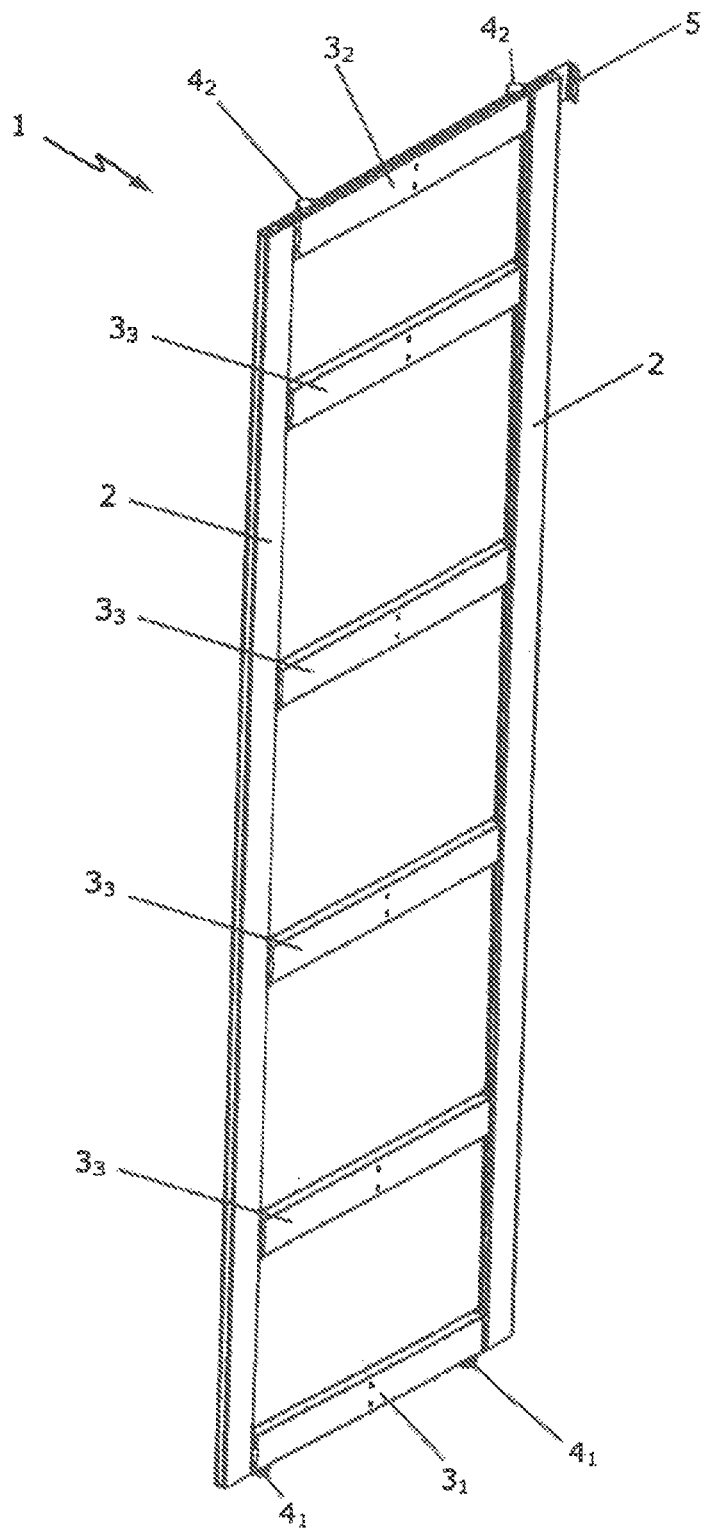
FIG. 1 shows in a perspective view a frame construction for a rack system according to the invention, assembled from two vertical columns and a plurality of horizontal crossbeams.

The frame construction 1 shown in FIG. 1 serves, for instance, as a side wall of a rack system and comprises two vertical columns 2 and a plurality of horizontal crossbeams 31, 32, 33, which are fastened to the two vertical columns 2. The bottommost and the topmost crossbeam 31, 32 are firmly screwed to the columns 2 and the middle crossbeams 33 are hanging on the columns 2. Lower adjustable feet 41, with which the frame construction 1 stands on a floor 31 are fastened to the bottommost crossbeam, and upper adjustable feet 42 are optionally fastened to the topmost crossbeam 32 for a ceiling to floor clamping of the frame construction 1. Further, at the height of the topmost crossbeam 32, a bracket 5 is fastened to the, in FIG. 1, right-hand column 2 for binding the frame construction 1 to a wall.

As shown in FIGS. 2a, 2b, the columns 2 are each formed by an open-ended, rectangular hollow profiled column element 10 having a longitudinal groove 11, the two groove legs 12 of which lying opposite each other each have two front longitudinal ribs 13 on the inside. The respectively rear rib of the two front longitudinal ribs 13 of the two groove legs 12 is formed by a transverse wall of the hollow profiled column element 10. Further, the two groove legs 12 each have on the inside a longitudinal shoulder 14 arranged ahead of the two longitudinal ribs 13, a latching step 15 arranged ahead of the longitudinal shoulder 14, and two rear longitudinal ribs 16 arranged after the front longitudinal ribs 13. Where necessary, a flat steel profile can be inserted between the two rear longitudinal ribs 16 of the two groove legs 12 for reinforcement against profile sagging. The hollow profiled column element 10 is preferably an extruded profile made, for example, of aluminum.

As shown in FIGS. 3a, 3b, the crossbeams 31, 32, 33 are each formed by an open-ended, rectangular hollow profiled crossbeam element 20, which has in the inside an upper and a lower screw channel 21, a central longitudinal channel 22 arranged between the screw channels 21, and a plurality of wall thickenings 23 for optional transverse profile bores. The hollow profiled crossbeam element 20 is preferably likewise an extruded profile made, for example, of aluminum.

Figure 4A:
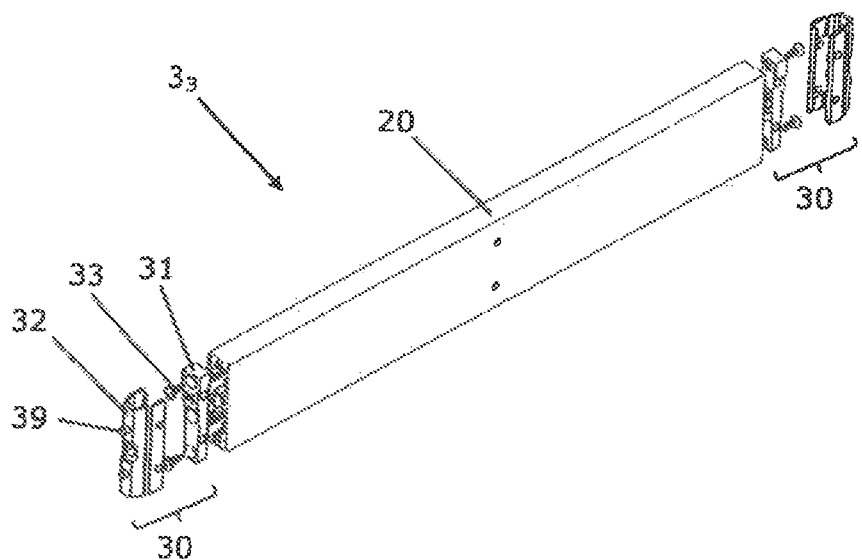
FIGS. 4a, 4b show the construction of a middle crossbeam (FIG. 4a) shown in FIG. 1 and the construction of the bottommost and topmost crossbeam (FIG. 4b) shown in FIG. 1.

As shown in FIG. 4a, a middle crossbeam 33 of the frame construction 1 is assembled from the hollow profiled crossbeam element 20 and two crossbeam connectors 30, which latter are each fastened to the end face of the hollow profiled crossbeam element 20. The crossbeam connectors 30 are structurally identical and formed in two parts by an inner connector part 31 and an outer connector part 32. The inner connector part 31 is, on the one hand, screwed onto the end face of the hollow profiled crossbeam element 20 by means of two screws 33 which are screwed into the screw channels 21 of the hollow profiled crossbeam element 20, and, on the other hand, plugged or hung into the outer connector part 32 from above.

Figure 4B:
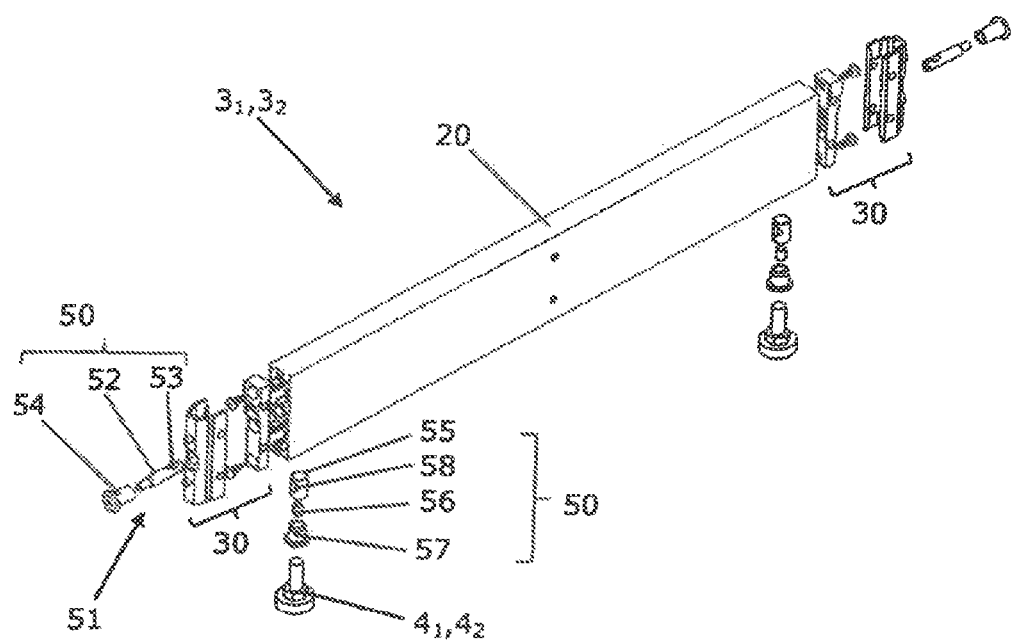

The bottommost or topmost crossbeam 31, 32 shown in FIG. 4b differs from the middle crossbeam 33 merely by an additional, multipart clamping unit 50. The clamping unit 50 comprises a two-part tension bolt 51, which is composed of a threaded bolt 52 having a transverse bore 53 and a screwed-on sleeve nut 54, and further comprises a guide housing 55 for the tension bolt 51, a threaded pin 56, which is screwed therein, and a knock-in socket 57 having a thread for an adjustable foot 41, 42.

Figure 5:
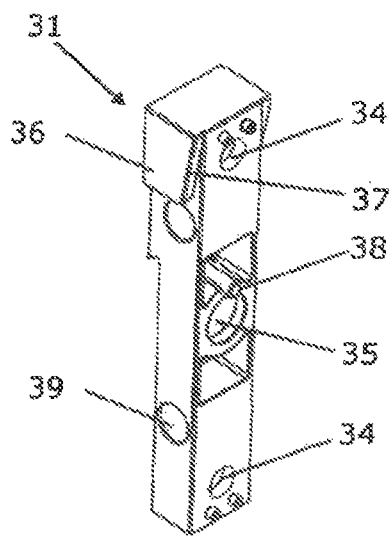
FIG. 5 shows in a perspective view an inner connector part of a crossbeam connector shown in FIGS. 4a, 4b.

The inner connector part 31 shown in FIG. 5 is a cuboid injection molded part made of plastic and has an upper and a lower through hole 34 for the screws 33, an intermediate central through hole 35 and, at the height of the upper through hole 34, on both sides respectively, a laterally protruding plug-in or hanging projection 36 having an oblique side edge 37. A pin 38 at the central through hole 35 ensures, together with an associated contour 24 of the longitudinal channel 22, a torque-proof mounting of the inner connector part 31 on the hollow profiled crossbeam element 20.

Figures 6A, 6B:
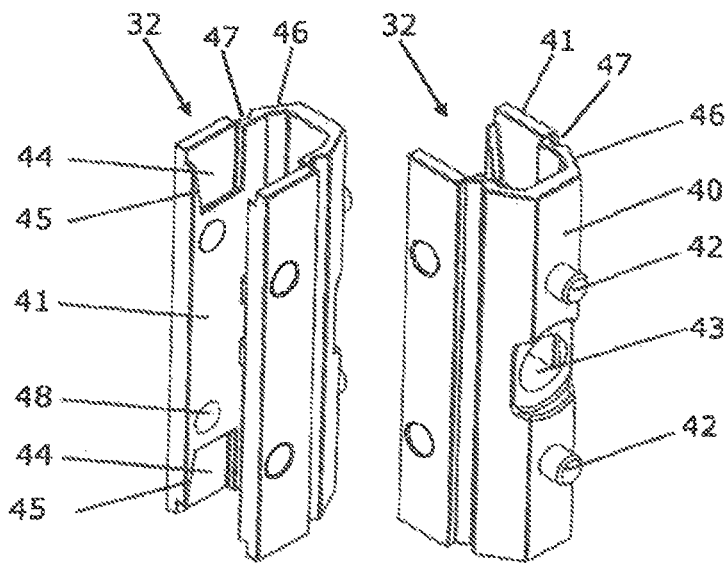
FIGS. 6a, 6b show in two different perspective views an outer connector part of a crossbeam connector shown in FIGS. 4a, 4b.

The outer connector part 32 shown in FIGS. 6a, 6b is an injection molded part made of plastic and is of U-shaped configuration having a middle leg 40 and two side legs 41. The middle leg 41 has on the outside an upper and a lower pin 42 and, therebetween, a central through hole 43. The two side legs 41 each have on the inside an upwardly open upper and a downwardly open lower plug-in or hanging receptacle 44 having an oblique side edge 45. The middle leg 40 is narrower than the distance of the two side legs 41 and transitions respectively via an oblique face 46 into the two side legs 41, wherein an external latching step 47 respectively runs between the oblique faces 46 and the side legs 41. The outer connector part 32 is mirror-symmetrical with respect to the transverse median plane passing through the central through hole 43.

The inner connector parts 31 can be hung with their hanging projection 36 into the upper hanging receptacle 44 of the outer connector parts 32, wherein the herein mutually interacting, oblique side edges 37, 46 effect a tightening of the two connector parts 31, 32 in the longitudinal direction of the hollow profiled crossbeam element 20.

As shown in FIG. 4b, the guide housing 55 is inserted into the hollow profiled crossbeam element 20 via a blind hole (not shown) in the bottom side of the hollow profiled crossbeam element 20 and oriented such that a guide bore 58 of the guide housing 55 runs coaxially to the longitudinal channel 22 of the hollow profiled crossbeam element 20. Thereafter, the knock-in socket 57 is hammered into the borehole, and the threaded pin 56 screwed into the knock-in socket 57. Once the inner connector parts 31 have been hung into the outer connector parts 32, the tension bolt 51 is stuck through the central through holes 35, 43 and inserted into the guide bore 58 of the guide housing 55 until the tension bolt 51, with its bolt head, namely with the sleeve rim of the sleeve nut 54, bears against the outside of the middle leg 40 of the outer connector part 32. The bolt head here protrudes on both sides over the middle leg 40. Finally, the threaded pin 56 is screwed in to the point where it engages, with its conical pin end, slightly in the transverse bore 53 and thereby secures the tension bolt 51 in the guide housing 55. The clamping unit 50 is now fixed to the hollow profiled crossbeam element 20, and the premounting of the bottommost and topmost crossbeam 31, 32 is completed.

Below, the individual mounting steps in the assembly of the frame construction 1 are described.

Figure 7A:
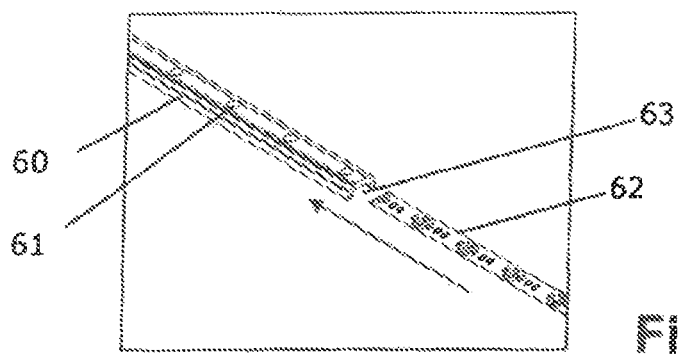
FIGS. 7a-7j show the individual mounting steps for the assembly of the frame construction shown in FIG. 1.

The hollow profiled column elements 10, the hollow profiled crossbeam elements 20 and two hole pattern strips 60 (FIG. 7a) are made to length. The hole pattern strips 60 have holes 61 at equidistant intervals, for example in the standard 32 mm furniture interval. An LED strip 62 is inserted into a C-groove 63 of the hole pattern strip 60 and is clampingly held therein (FIG. 7a). The hole pattern strips 60 and the LED strips 62 are respectively shorter than the hollow profiled column elements 10 by approximately the height of the topmost crossbeam 32. The hole pattern strips 60 are made of translucent plastic and are thus permeable for the light emitted by the LED strip 62. The cables of the LED strip 62 are not shown.

Figure 7B:
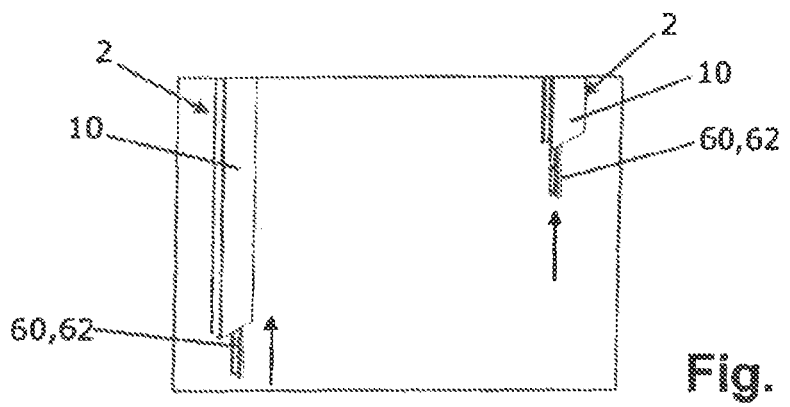

The hole pattern strips 60 provided with the LED strips 62 are inserted into the open-ended hollow profiled column elements 10 respectively between the two longitudinal ribs 13 (FIG. 7b) in order to form the columns 2. The hole pattern strips 60 here protrude downward out of the hollow profiled column element 10 by approximately the height of a crossbeam.

Figure 7C:
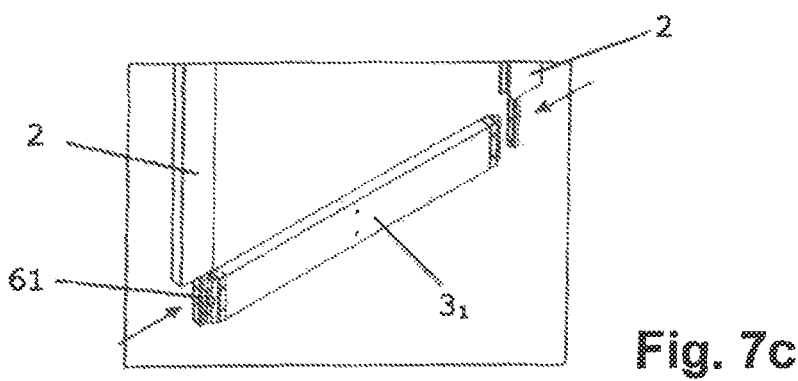

The premounted bottommost crossbeam 31 is positioned between the downwardly protruding hole pattern strips 60, and subsequently the two columns 2 are pushed together until the pins 42 of the outer connector parts 32 are plugged into the holes 61 of the hole pattern strips 60 (FIG. 7c).

Figure 7D:
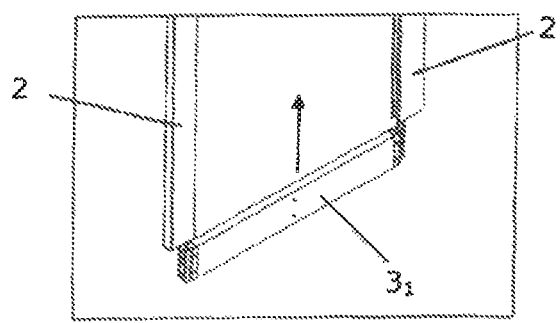
Figure 7E:
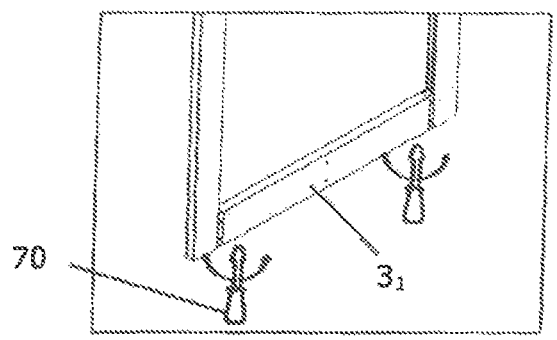

This plug-in composite of bottommost crossbeam 31 and hole pattern strips 60 is inserted into the hollow profiled column element 10 until the crossbeam bottom edge terminates flush with the hollow profiled column element 10 (FIG. 7d). The bolt head of the tension bolt 51 here enters into the longitudinal channel 11 of the hollow profiled column element 10 and back-grips, with its two projecting sides, the longitudinal shoulders 14 of the hollow profiled column element 10. Moreover, the latching step 47 of the outer connector 32 back-grips the latching step 15 of the hollow profiled column element 10. Finally, a screwdriver 70 is guided through the knock-in socket 57, and the premounted threaded pins 56 are screwed into the transverse bores 53 (FIG. 7e). The tension bolt 51 is here centered with its transverse bore 53 on the conical pin end of the threaded pin 56. As a result, the bolt head and the threaded pin 56 are drawn closer together, and thus the hollow profiled column element 10, back-gripped by the tension bolt 51, and the hollow profiled crossbeam element 20 are clamped together. Additionally or alternatively, the transverse bore 53 can also have a lead-in cone interacting with the threaded pin 56.

Figure 7F:
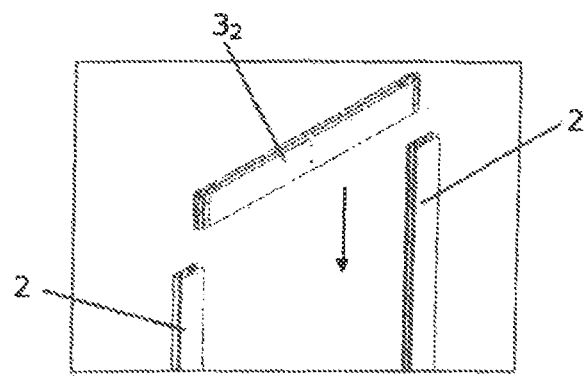
Figure 7G:
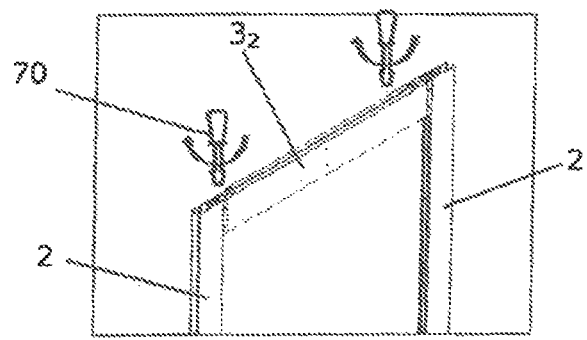

Since the hole pattern strip 60, due to its shorter length, does not reach up to the top edge of the columns 2, the premounted topmost crossbeam 32 can be inserted from above between the two columns 2 (FIG. 7f), until it ends with its top edge flush with the columns 2. The topmost crossbeam 32 thus does not engage the hole pattern strip 60 and is not bound to the defined height intervals. Like the bottommost crossbeam 31, the topmost crossbeam 32 is fastened with the aid of the screwdriver 70 (FIG. 7g).

Figure 7H:
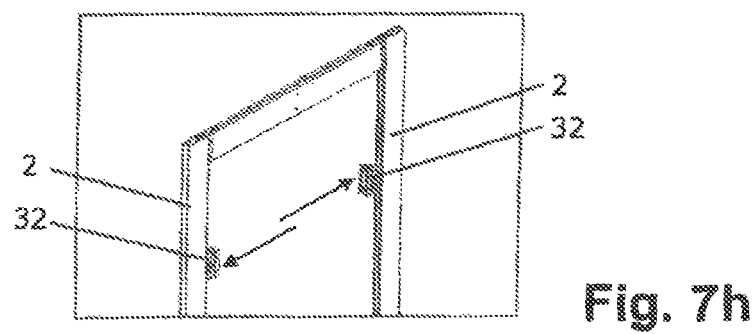
Figure 7I:
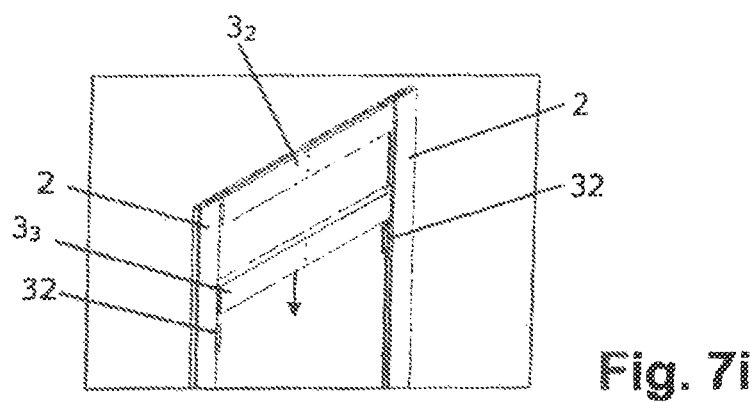
Figure 7J:
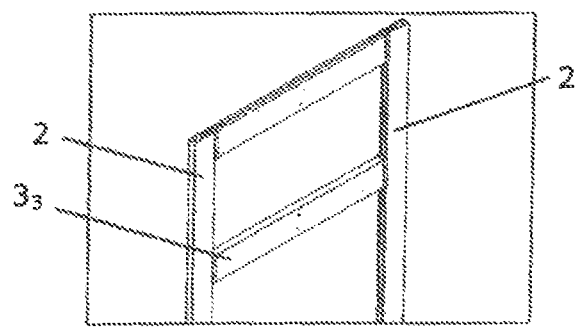

For the fastening of a middle crossbeam 33, its two outer connector parts 32 are firstly respectively clipped into the longitudinal groove 11 of the hollow profiled column elements 10 and, at the same time, the pins 42 of the outer connector parts 32 are here plugged into the holes 61 of the hole pattern strips 60 (FIG. 7h). In the clipping-in process, the two side legs 41 of the outer connector part 32 spring slightly inward until their latching steps 47 are latched behind the latching steps 15 of the hollow profiled column element 10. By compression of the two side legs 41, the outer connector parts 32 are able to be removed again and repositioned. Finally, the middle crossbeam 33 is positioned between the columns 2 (FIG. 7i) and hung with its inner connector parts 31 from above into the two latched outer connector parts 32 (FIG. 7j). The hole pattern strips 60 form the load transfer members of the middle crossbeams 33. Since not the truncated bottom edge, but rather the holes 61 of the hole pattern strip 60 form the height reference, a high tolerance in the cutting to size of the hole pattern strip is possible.

The interior of the outer connector parts 32 is filled by the hanging inner connector parts 31, so that the side legs 41 of the outer connector parts 32 cannot be deflected inward, and thus the outer connector parts 32 cannot be detached from the columns 2. Interface holes for transversely running fastening elements (for example transverse screws) of attachment elements (for example furniture fittings) lead through the hollow profiled column element 10 and the crossbeam connectors 31, 32. In FIG. 5 the interface holes 39 of the inner connector part 31, and in FIGS. 6a, 6b the interface holes 48 of the outer connector part 32, are shown. As soon as an attachment element is fastened, there is a type of "pinning together" of hollow profiled column element 10 and crossbeam connectors 31, 32 one to another, and a detachment of the middle crossbeam 33 is no longer possible without removal of the attachment elements.

The light emitted by the LED strips 62 through the hole pattern strips 60 escapes from the longitudinal grooves 11 of the hollow profiled column elements 10 and ensures an "ambient lighting" of the frame construction 1. Heat from the LED strips 62 is dissipated rearward to the hollow profiled column elements 10.

What is claimed is:

1. A frame construction for a rack system, comprising:
   two vertical columns each in the form of a rectangular hollow profiled column element having a longitudinal groove, two groove legs of which lying opposite each other each have on an inside two longitudinal ribs;
   a hole pattern strip which is inserted between the two longitudinal ribs into the hollow profiled column element;
   a plurality of horizontal crossbeams, which are fastened to the two vertical columns, each in the form of a rectangular hollow profiled crossbeam element; and
   crossbeam connectors having at least one pin and being fastened to end faces of the hollow profiled crossbeam element;
   wherein the crossbeam connectors each engage, with the at least one pin, in one of the holes of the hole pattern strips; and
   wherein the hollow profiled crossbeam element includes a screw channel, and wherein the crossbeam connectors are each formed in two parts by an inner and an outer connector part, wherein the inner connector part is fastened to the end face of the hollow profiled crossbeam element by means of a screw screwed into the screw channel of the hollow profiled crossbeam element, and the inner connector part is plugged in a plug-in direction into the outer connector part.

2. The frame construction as claimed in claim 1, wherein the hole pattern strips are formed of translucent material, wherein on the back of the hole pattern strips an LED strip is respectively arranged.

3. The frame construction as claimed in claim 1, wherein the hole pattern strips have holes at equidistant intervals.

4. The frame construction as claimed in claim 1, wherein the hole pattern strips are respectively shorter in a length than the hollow profiled column elements by approximately a width of the topmost crossbeam.

5. The frame construction as claimed in claim 1, wherein at least the bottommost and the topmost crossbeam are fixedly connected at the columns.

6. The frame construction as claimed in claim 1, wherein the plurality of horizontal crossbeams includes at least three crossbeams, one of which is a middle crossbeam held hanging from the two vertical columns.

7. The frame construction as claimed in claim 1, wherein the two connector parts each have a tightening contour running obliquely to the plug-in direction in order to mutually tighten the plugged together connector parts transversely to the plug-in direction.

8. The frame construction as claimed in claim 1, wherein the two groove legs of the hollow profiled column element and the outer connector part each have a mutually interacting clip contour for clipping of the outer connector part into the longitudinal groove and/or displacement of the outer connector part along the longitudinal groove.

9. The frame construction as claimed in claim 1, wherein the hollow profiled column element has a longitudinal shoulder arranged ahead of the two longitudinal ribs and wherein a tension bolt having a tension head is stuck through the two connector parts into a longitudinal channel of the hollow profiled crossbeam element and bears against the outside of the outer connector part with the bolt head, which respectively back-grips the longitudinal shoulder of the hollow profiled column element and, by means of a screwed-in, clamping element, running transversely in the hollow profiled crossbeam element, can be drawn further into the longitudinal channel in order to clamp the crossbeam to the respective column.

10. The frame construction as claimed in claim 9, wherein the tension bolt has a transverse bore and wherein the clamping element engages in the transverse bore of the tension bolt, and in that the clamping element and/or the transverse bore are configured obliquely to one another in such a way that, upon engagement, the tension bolt is centered on the clamping element and thereby tightened.

11. The frame construction as claimed in claim 1, wherein the crossbeam connectors have interface holes for transversely running fastening elements of attachment elements.

12. The frame construction as claimed in claim 1, wherein the hollow profiled column elements and/or the hollow profiled crossbeam elements are extruded profiles.

13. The frame construction as claimed in claim 1, wherein the hollow profiled column elements and/or the hollow profiled crossbeam elements are extruded profiles of metal.

14. The frame construction as claimed in claim 1, wherein the crossbeam connectors are formed of plastic.

15. The frame construction as claimed in claim 2, wherein the translucent material is plastic.

16. The frame construction as claimed in claim 2, wherein the LED strip is stuck to the back of the hole pattern strip.

17. The frame construction as claimed in claim 2, wherein the back of the hole pattern strip has C-groove in which the LED strip is disposed.

* * * * *

UNITED STATES PATENT AND TRADEMARK OFFICE
CERTIFICATE OF CORRECTION

PATENT NO. : 10,779,650 B2  
APPLICATION NO. : 16/554508  
DATED : September 22, 2020  
INVENTOR(S) : Jasmin Radloff and Constantin Ebel Page 1 of 1

It is certified that error appears in the above-identified patent and that said Letters Patent is hereby corrected as shown below:

On the Title Page

Item (30) Foreign Application Priority Data should be added:  
--Apr. 25, 2017 (DE) 20 2017 102 414.8--

Signed and Sealed this  
Twenty-ninth Day of June, 2021

Drew Hirshfeld  
*Performing the Functions and Duties of the*  
*Under Secretary of Commerce for Intellectual Property and*  
*Director of the United States Patent and Trademark Office*